(12) United States Patent
Meunier

(10) Patent No.: US 7,890,859 B2
(45) Date of Patent: Feb. 15, 2011

(54) RAPID SIMILARITY LINKS COMPUTATION FOR TABLE OF CONTENTS DETERMINATION

(75) Inventor: Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 1392 days.

(21) Appl. No.: 11/360,951

(22) Filed: Feb. 23, 2006

(65) Prior Publication Data

US 2007/0198912 A1    Aug. 23, 2007

(51) Int. Cl.
G06F 17/21 (2006.01)
(52) U.S. Cl. ...................................... 715/256
(58) Field of Classification Search ................... 715/256
See application file for complete search history.

(56) References Cited

U.S. PATENT DOCUMENTS

| | | | |
|---|---|---|---|
| 5,359,729 A * | 10/1994 | Yarnell et al. ................... | 707/2 |
| 5,434,962 A | 7/1995 | Kyojima et al. | |
| 5,491,628 A | 2/1996 | Wakayama et al. | |
| 6,298,357 B1 | 10/2001 | Wexler et al. | |
| 6,487,566 B1 | 11/2002 | Sundaresan | |
| 6,490,603 B1 | 12/2002 | Keenan et al. | |
| 2002/0143818 A1 | 10/2002 | Roberts et al. | |
| 2003/0093760 A1 | 5/2003 | Suzuki et al. | |
| 2003/0208502 A1 | 11/2003 | Lin | |
| 2004/0003028 A1 * | 1/2004 | Emmett et al. .............. | 709/203 |
| 2004/0024780 A1 | 2/2004 | Agnihotri et al. | |
| 2004/0205461 A1 * | 10/2004 | Kaufman et al. ............ | 715/500 |

OTHER PUBLICATIONS

Dejean et al., "Structuring Documents According to Their Table of Contents," Proceedings 2005 ACM Symposium on Document Engineering, 2005.
Yacoub et al., "Identification of Document Structure and Table of Content in Magazine Archives," Proceedings 2005 Eight International Conference on Document Analysis and Recognition, 2005.
Lin et al., "Detection and Analysis of Table of Contents Based on Content Association," International Journal of Document Analysis and Recognition, vol. 8, No. 2-3, 2005.

(Continued)

Primary Examiner—Doug Hutton
Assistant Examiner—Tionna Smith
(74) Attorney, Agent, or Firm—Fay Sharpe LLP

(57) ABSTRACT

In a method for identifying a table of contents in a document (8), an initial indexing text fragment at about the middle of an ordered sequence of indexing text fragments (14) is associated with an initial set of one or more candidate linked body text fragments selected from an ordered sequence of body text fragments (16). A lower-ordered indexing text fragment at lower order than the initial indexing text fragment is associated with a set of one or more candidate linked body text fragments at lower order than the highest order member of the initial set of one or more candidate linked body text fragments. A higher-ordered indexing text fragment at higher order than the initial indexing text fragment is associated with a set of one or more candidate linked body text fragments at higher order than the lowest order member of the initial set of one or more candidate linked body text fragments.

21 Claims, 7 Drawing Sheets

OTHER PUBLICATIONS

Déjean et al., "Structuring Documents According to Their Table of Contents," Doc. Eng. '05, Bristol, UK, Nov. 2-4, 2005.

Déjean et al., "A System for Converting PDF Documents into Structured XML Format," 7th IAPR Workshop on Document Analysis Sytems, Nelson, New Zealand, Feb. 13-15, 2006.

Chanod et al., "From Legacy Documents to SML: A Conversion Framework," 9th European Conf. on Research and Advanced Technology for Digital Libraries, Vienna, Austria, Sep. 18-23, 2005.

Adler, S., et al., "Extensible stylesheet language (XSL), Version 1.0," W3C 2001, http://www.w3.org/TR/2001/REC-xsl-20011015/.

Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.

Anjewierden, A., "AIDAS: Incremental logical structure discovery in PDF documents", Proceedings of the International Conference on Document Analysis and Recognition (ICDAR), Seattle, 2001.

Belaïd, A., Pierron, L., Valverde, N., "Part-of-speech tagging for table of contents recognition", International Conference on Pattern Recognition (ICPR 2000), vol. 4, Sep. 3-8, 2000 Barcelona, Spain.

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analysis*, World Scientific Publishing Company, 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, World Scientific Publishing Company, 1997, pp. 421-456.

Klink, S., Dengel, A., Kieninger, T., "Document structure analysis based on layout and textual features", Pcroceedings of Fourth IAPR International Workshop on Document Analysis Systems, DAS 2000, Rio de Janeiro, Brazil, 2000, pp. 99-111.

Lin, C.C., Niwa, Y., Narita, S., "Logical structure analysis of book document images using contents of information", 4th International Conference on Document Analysis and Recognition (ICDAR'97), Ulm, Germany, Aug. 1997, pp. 1048, 1054.

Lin, X., "Header and footer extraction by page-association", Hewlett-Packard Company Technical Report, 2002, www.hpl.hp.com/techreports/2002/hpl-2002-129.pdf.

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-22, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting PDF files into XML", *CambridgeDocs*, 2004, www.cambridgedocs.com.

U.S. Appl. No. 11/032,817, filed Jan. 10, 2005, Herve Dejean et al.
U.S. Appl. No. 11/033,016, filed Jan. 10, 2005, Herve Dejean et al.
U.S. Appl. No. 11/116,100, filed Apr. 27, 2005, Dejean et al.
U.S. Appl. No. 11/032,814, filed Jan. 10, 2005, Dejean et al.
U.S. Appl. No. 11/137,566, filed May 26, 2005, Meunier.
U.S. Appl. No. 10/756,313, filed Jan. 14, 2004, Chidlovskii et al.

* cited by examiner

RAPID SIMILARITY LINKS COMPUTATION FOR TABLE OF CONTENTS DETERMINATION

BACKGROUND

The following relates to the information storage and processing arts. It finds particular application in conjunction with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

There is interest in the information storage and processing arts in converting document databases to a common structured format that is structured based on document content so as to facilitate searching, document categorizing, and so forth. Some suitable structured document paradigms include XML, SGML, HTML, or so forth. The content of unstructured documents is sometimes arranged by a table of contents that identifies chapters, sections, or so forth. Thus, there is interest in developing methods and apparatuses for extracting the table of contents from the document, and using the extracted table of contents as a framework for structuring the document.

Existing techniques for extracting a table of contents typically involve extracting an ordered sequence of text fragments from the document, and looking for pairs of text fragments that are similar respective to font size, font style, textual content, or so forth. If the position of the table of contents within the document is unknown, this type of processing can lead to $N \times (N-1)/2$ text fragment pair comparisons for a document having N text fragments. Such $O(N^2)$ type computations can become prohibitively costly for large documents, e.g., a document including 20,000 to 60,000 text fragments involves approximately 400 million to 3.6 billion text fragment pair comparisons.

On the other hand, if the position of the table of contents is known a priori such that the document can be divided into T table of contents text fragments and N body text fragments, then the number of text fragment pair comparisons is reduced to $N \times T$. For the example document of between 20,000 and 60,000 text fragments indexed by a table of contents containing between 100 and 300 indexing text fragments, between 2 million and 18 million text fragment pair comparisons are involved. This large number of pair comparisons, while reduced compared with the $O(N^2)$ type computation, can still be problematic.

Accordingly, there is a continuing need in the art for improved techniques for table of contents extraction.

INCORPORATION BY REFERENCE

The following are commonly assigned U.S. patent applications, each of which is incorporated herein by reference.

Meunier et al., "Table of Contents Extraction with Improved Robustness" (Xerox ID 20051557-US-NP, Ser. No. 11/360,963 filed Feb. 23, 2006) is incorporated herein by reference in its entirety. This application relates at least to table of contents extraction with improved robustness.

Dejean et al., "Structuring Document based on Table of Contents," Ser. No. 11/116,100 filed Apr. 27, 2005 is incorporated herein by reference in its entirety. This application relates at least to organizing a document as a plurality of nodes associated with a table of contents.

Dejean et al., "Method and Apparatus for Detecting a Table of Contents and Reference Determination," Ser. No. 11/032,814 filed Jan. 10, 2005 is incorporated herein by reference in its entirety. This application relates at least to a method for identifying a table of contents in a document. An ordered sequence of text fragments is derived from the document. A table of contents is selected as a contiguous sub-sequence of the ordered sequence of text fragments satisfying the criteria: (i) entries defined by text fragments of the table of contents each have a link to a target text fragment having textual similarity with the entry; (ii) no target text fragment lies within the table of contents; and (iii) the target text fragments have an ascending ordering corresponding to an ascending ordering of the entries defining the target text fragments.

Dejean et al., "Method and Apparatus for Detecting Pagination Constructs Including a Header and a Footer In Legacy Documents," Ser. No. 11/032,817 filed Jan. 10, 2005 is incorporated herein by reference in its entirety. This application relates at least to detecting header and footer content in a document.

Dejean et al., "Method and Apparatus for Structuring Documents based on Layout, Content and Collection," Ser. No. 11/033,016 filed Jan. 10, 2005 is incorporated herein by reference in its entirety. This application relates at least to conversion of a document in a relatively flat layout to a structured document in a hierarchal form.

Meunier, "Method and Apparatus for Determining Logical Document Structure," Ser. No. 11/137,566 filed May 26, 2005 is incorporated herein by reference in its entirety. This application relates at least to processing documents having text arranged in multiple columns on a page.

Chidlovskii et al., "Systems and Methods for Converting Legacy and Proprietary Documents into Extended Markup Language Format," Ser. No. 10/756,313 filed Jan. 14, 2004 is incorporated herein by reference in its entirety. This application relates at least to conversion of legacy and proprietary documents into extended mark-up language format which treats the conversion as transforming ordered trees of one schema and/or model into ordered trees of another schema and/or model.

BRIEF DESCRIPTION

According to certain aspects illustrated herein, a method is disclosed for identifying a table of contents in a document. An initial indexing text fragment at about the middle of an ordered sequence of indexing text fragments is associated with an initial set of one or more candidate linked body text fragments selected from an ordered sequence of body text fragments. A lower-ordered indexing text fragment at lower order than the initial indexing text fragment is associated with a set of one or more candidate linked body text fragments at lower order than the highest order member of the initial set of one or more candidate linked body text fragments. A higher-ordered indexing text fragment at higher order than the initial indexing text fragment is associated with a set of one or more candidate linked body text fragments at higher order than the lowest order member of the initial set of one or more candidate linked body text fragments.

According to certain aspects illustrated herein, a method is disclosed for identifying a table of contents in a document. The method comprises: (a) associating an initial indexing text fragment at about the middle of an ordered sequence of indexing text fragments with an initial set of one or more candidate linked body text fragments selected from an ordered sequence of body text fragments; (b) selecting the lower-ordered indexing text fragment to be at about the middle of a low order sub-set of the ordered sequence of indexing text fragments defined by the set of indexing text fragments at lower order than the initial indexing text fragment; (c) selecting the higher-ordered indexing text fragment to be at about the middle of a high order sub-set of the ordered sequence of indexing text fragments defined by the set of indexing text fragments at higher order than the initial indexing text fragment; (d) associating the lower-ordered indexing text fragment with a set of one or more candidate linked body text fragments at lower order than the highest order member of the initial set of one or more candidate linked body text fragments; (e) associating the higher-ordered indexing text fragment with a set of one or more candidate linked body text fragments at higher order than the lowest order member of the initial set of one or more candidate linked body text fragments; (f) repeating the selecting and associating operations (b), (c), (d), (e) for the low order sub-set of the ordered sequence of indexing text fragments using the lower ordered indexing text fragment as the initial indexing text fragment; and (g) repeating the selecting and associating operations (b), (c), (d), (e) for the high order sub-set of the ordered sequence of indexing text fragments using the higher ordered indexing text fragment as the initial indexing text fragment.

According to certain aspects illustrated herein, a method is disclosed for identifying a table of contents in a document including of an ordered sequence of indexing text fragments and an ordered sequence of body text fragments. A lower-ordered indexing text fragment is associated with a set of one or more candidate linked body text fragments at lower order in the ordered sequence of body text fragments than a highest order candidate linked body text fragment associated with a set of N contiguous indexing text fragments at higher order and abutting the lower-ordered indexing text fragment in the ordered sequence of indexing text fragments. A higher-ordered indexing text fragment is associated with a set of one or more candidate linked body text fragments at higher order in the ordered sequence of body text fragments than a lowest order candidate linked body text fragment associated with a set of M contiguous indexing text fragments at lower order and abutting the higher-ordered indexing text fragment ordered sequence of indexing text fragments. The order of the lower-ordered indexing text fragment is decremented. The order of the higher-ordered indexing text fragment is incremented. The associating of the lower ordered indexing text fragment, the associating of the higher ordered indexing text fragment, the decrementing, and the incrementing is repeated to generate sets of one or more candidate linked body text fragments associated with the indexing text fragments.

DETAILED DESCRIPTION

In table of contents extraction techniques employing pairwise comparisons of text fragments, the output is typically a set of text fragments (possibly represented by pointers to locations within the document) corresponding to table of content entries, each of which is coupled with a linked text fragment (again, possibly represented by a document pointer) indicating the corresponding chapter heading, section heading, or other heading. The pairwise comparisons used to associate indexing text entries of the table of contents with linked body text fragments can involve various criteria, such as font size, font type, font style, use of capitalization, underscoring, or so forth.

In the following, an illustrative example table of contents extraction approach using pairwise text fragment comparisons based on textual similarity is set forth. However, it is to be understood that other types of pairwise text fragment comparisons can be used, including for example text fragment pair comparisons based on textual similarity, font size, font type, font style, use of capitalization, underscoring, or so forth, or various combinations thereof.

Figure 1:
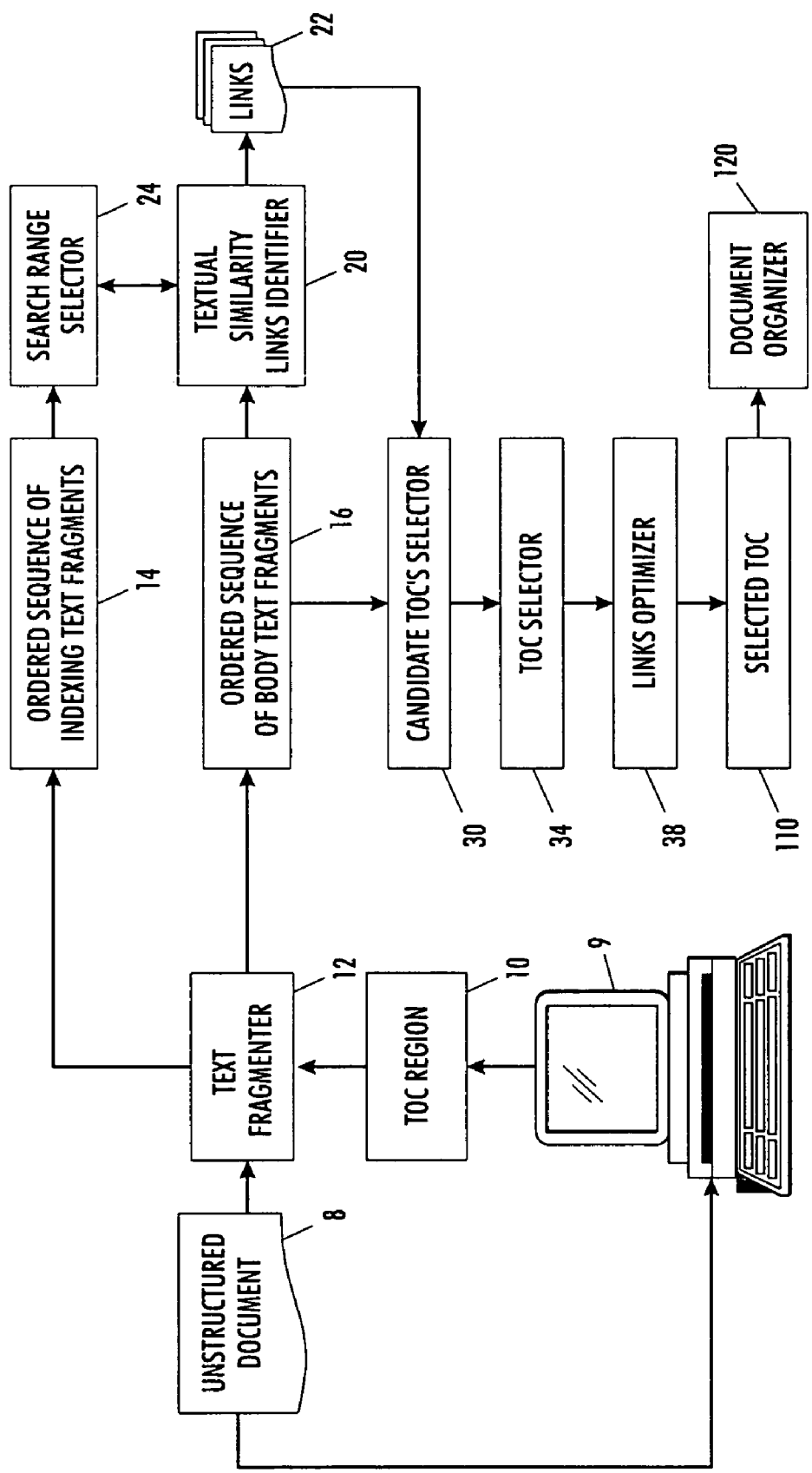
FIG. 1 diagrammatically shows an apparatus for identifying a table of contents.

With reference to FIG. 1, an unstructured document 8 is produced by word processing software, spreadsheet software, or another application program, or is generated by optically scanning a hardcopy of a document, or is produced in some other way. A user interface 9 receives a selection of a table of contents region 10 from a user. Alternatively, the table of contents region 10 can be identified automatically (for example, by searching for text including extended ellipses terminating in page numbers, looking for text lines beginning or ending in numeric values, having the table of contents region 10 automatically identified by word processing or other application software that generated the unstructured document 8, or so forth). A text fragmenter 12 breaks the unstructured document 8 into (i) an ordered sequence of indexing text fragments 14 extracted from the table of contents region 10 of the document 8; and (ii) an ordered sequence of body text fragments 16 extracted from at least one region of the document 8 other than the table of contents region 10. Typically, the unstructured document 8 is loaded as a list of text strings from a text or XML file produced from a document in an input format (such as Adobe PDF, Word FrameMaker, or so forth), using an off-the-shelf converter. A paper document is suitably scanned using an optical scanner and processed by optical character recognition (OCR). For a text document, each line suitably becomes a fragment ordered line by line. For an XML or HTML document, each PCDATA suitably becomes a text fragment.

Several strategies can be used to order the textual fragments: depth-first left-to-right traversal (document order) or use of the fragment position in the page. Also, the relationship between XML nodes and text fragments can be preserved in order to map the detected table of contents and references back onto XML nodes at the end of the process. It is to be appreciated that the text fragmenter 12 can fragment the textual content in lines, blocks, series of words of a line, or even may split a word across two text fragments (for example, due to a different formatting on the first character of the first word of a title).

The resulting ordered sequences of indexing and body text fragments 14, 16 are processed by a textual similarity links identifier 20 that identifies candidate links 22. Each link is defined by a pair of textually similar text fragments—one text fragment being one of the indexing text fragments 14, and the other text fragment of the pair being one of the body text fragments 16. There are various ways of defining such pairs of text fragments. In general, for T indexing text fragments and N body text fragments, the number of text fragment pairwise comparisons is T×N. As will be discussed herein, however, a search range selector 24 is employed to identify a sub-sequence of the ordered sequence of body text fragments 16 for searching, so that the number of text fragment pairwise comparisons is typically substantially less than T×N.

Additionally, the possible presence of noise in the text should be accounted for in making textual comparisons. Noise can come from various sources, such as incorrect PDF-to-text conversion, or table of contents-specific problems such as a page number that appears in the table of contents but not in the document body, or a series ellipses ( . . . ) that relate the page number to the section title in the table of contents. In some embodiments, each text fragment is tokenized into a series of alphanumeric tokens with non-alphanumeric separators such as tabs, spaces, or punctuation signs. In some embodiments, a Jaccard is used to measure textual similarity. The Jaccard is computed as the cardinal of the intersection of the two token sets defined by indexing text fragment and the body text fragment divided by the cardinal of the union of these two token sets. A link is defined for those pairs in which the Jaccard measure is above a selected matching threshold. In other embodiments an edit distance or other suitable measure is used as the textual similarity comparison. For an edit distance measure, the threshold is a maximum—those pairs having an edit distance less than an edit distance threshold are designated as textually similar pairs.

The textual similarity links are suitably designated as (#i, #j) which denotes a link between an indexing text fragment #i taken from the ordered sequence of indexing text fragments 14 and a body text fragment #j taken from the ordered sequence of body text fragments 16. If a link (#i, #j) satisfies the threshold or other link selection criterion, then the link (#i, #j) is included as a one of the candidate links 22. It will be appreciated that each of the candidate links 22 which exceed the threshold has an associated Jaccard or other metric value that indicates the strength of the link in terms of textual similarity. Although links are identified based on textual similarity (such as using the example Jaccard textual similarity measure) in the illustrated embodiment, in other contemplated embodiments links are identified based on font size, font style, font characteristic, use of capitalization, use of underscoring, or so forth, or based on various combinations of these examples, various combinations of these examples along with textual similarity, or so forth.

Figure 2:
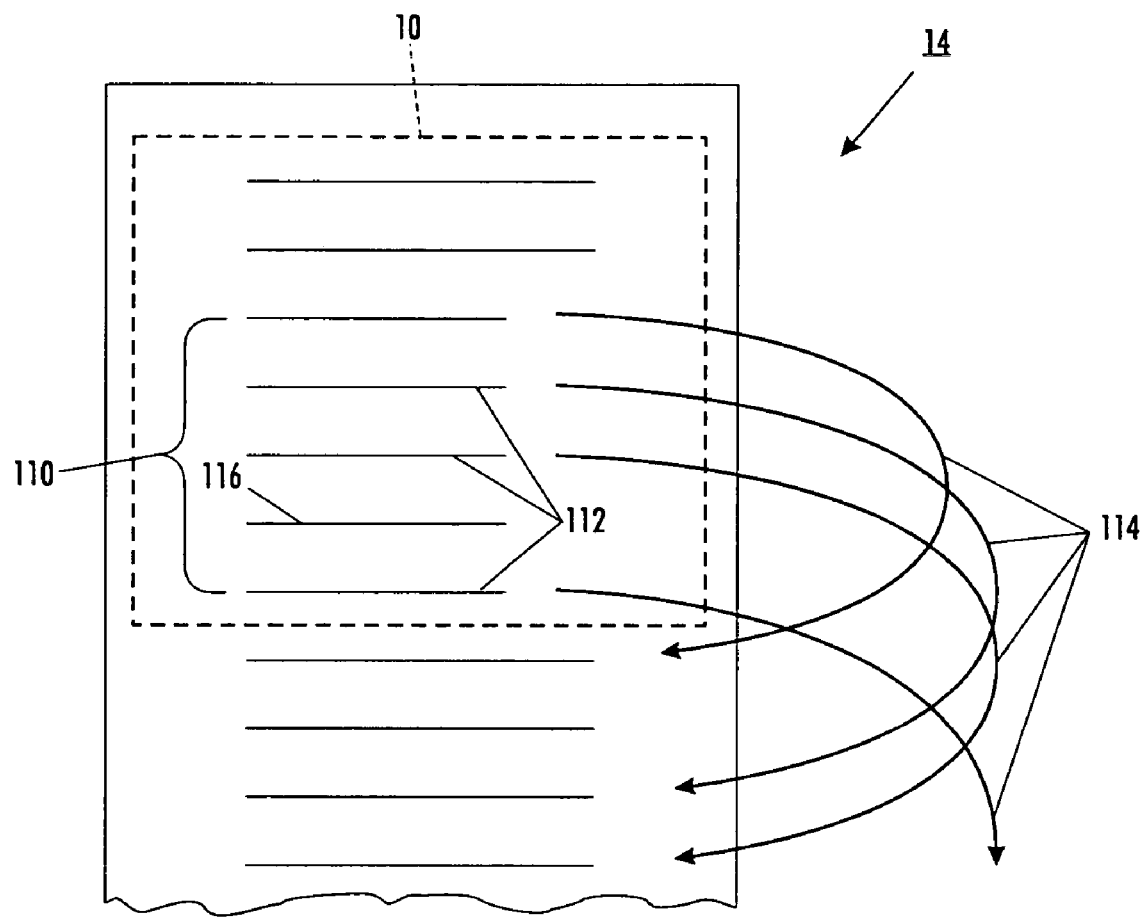
FIG. 2 diagrammatically shows an identified table of contents.

With reference to FIG. 2, a table of contents 110 resides within the table of contents region 10. In some cases, the table of contents may span the entire table of contents region, while in other cases (such as that illustrated in FIG. 2) the table of contents 110 may span only a portion of the table of contents region 10. Four general criteria are used to distinguish and identify links between table of contents entries and section headings, chapter headings, or other linked text fragments of the body of the text. The first criterion is contiguity. The table of contents includes a contiguous sequence or sub-sequence of the table of contents region 10. Most of the text fragments of this contiguous sub-sequence are expected to be entries 112 of the table of contents. Each table of content entry is linked to a portion of the text that follow the table of contents by one of the links. These links that are associated with the table of contents 110 are indicated in FIG. 2 as curved arrows 114. It is to be appreciated that the links 114 of the table of contents 110 are a sub-set of the candidate links 22 computed by the textual similarity links identifier 20. The candidate links 22 typically include links in addition to the sub-set of links 114. The sub-set of links 114 denote linked text fragments that correspond with table of content entries.

Although most of the text fragments of the table of contents 110 are entries 112, a small portion of the text fragments may be holes, rather than entries 112. The holes do not have associated links 114, and do not represent a table of contents entry linking to another portion of the document. An example hole 116 is shown in FIG. 2. Typically, a ratio of the number of holes to the number of entries is less than about 0.2. In some embodiments, the maximum acceptable number of holes is a user-selectable parameter.

The second criterion is textual similarity. Each link 114 should connect an entry 112 to a heading or other linked text fragment having text that is similar to the text of the entry. The textual similarity is suitably measured by the Jaccard or other text similarity measure employed by the textual similarity links identifier 20. The linked body text fragment is typically a section heading in the case of an ordinary table of contents. In the case of a table of contents listing figures of the document (i.e., a table of figures) the linked body text fragment may be a figure caption. In the case of a table of contents listing tables of the document (i.e., a table of tables) the linked body text fragment may be a table caption. In some documents the figure and/or table captions may be below the corresponding figures and/or tables.

The third criterion is ordering. The linked body text fragments of the links 114 should have an ascending ordering corresponding to the ascending ordering of the entries 112. That is, for a set of entries $\{\#i_1, \#i_2, \#i_3, \ldots\}$ having a set of links $\{(\#i_1,\#j_1), (\#i_2,\#j_2), (\#i_3,\#j_3), \ldots\}$ where the set of entries $\{\#i_1, \#i_2, \#i_3, \ldots\}$ have an ascending ordering, it should follow that the ordering of the corresponding set of linked body text fragments $\{\#j_1, \#j_2, \#j_3, \ldots\}$ is also ascending.

The fourth criterion is lack of self-reference. All of the links 114 should initiate from within the table of contents 110, and none of the links 114 should terminate within the table of contents 110. This is suitably achieved by having the set of entries $\{\#i_1, \#i_2, \#i_3, \ldots\}$ be selected from the indexing text fragments 14 that are extracted from the table of contents region 10, and by having the corresponding set of linked body text fragments $\{\#j_1, \#j_2, \#j_3, \ldots\}$ be selected from the body text fragments 16 that are extracted from one or more regions of the document 8 other than the table of contents region 10. The sets $\{\#i_1, \#i_2, \#i_3, \ldots\}$ and $\{\#j_1, \#j_2, \#j_3, \ldots\}$ should have an empty intersection, and moreover none of the linked body text fragments $\{\#j_1, \#j_2, \#j_3, \ldots\}$ should correspond to a hole text fragment in the table of contents 110.

With returning reference to FIG. 1, the table of contents region 10 is known a priori, for example based on a user input or based on automated delineation of the table of contents region by an application program generating the document 8. In some embodiments, the table of contents is assumed to substantially span or fill the table of contents region 10. In such a case, the exact location of the table of contents corresponds to the table of contents region 10. In some embodiments, however, the table of contents may be substantially smaller than the a priori known table of contents region 10. For example, the user may have indicated which page or pages of a scanned document contain the table of contents (so that the table of contents region 10 corresponds to the indicated page or pages), but the actual table of contents may reside on only a portion of the identified page or pages. In these cases, the precise location of the table of contents within the table of contents region 10 should be determined.

In one approach for identifying the table of contents within the table of contents region 10, the table of contents is selected based on the contiguity, text similarity, ordering, and non-self-referencing criteria. A candidate tables of contents selector 30 selects one or more candidate tables of contents from within the table of contents region 10. In one suitable approach, T-Δ hypotheses are tested, where T is the number of indexing text fragments in the ordered sequence of indexing text fragments 14 and Δ is a minimum anticipated table of contents length. For each of the T-Δ possible starting fragments, the hypothesis "Could the table of contents start at this indexing text fragment?" is tested. In some suitable embodiments, the testing starts at the candidate starting text fragment and then looks at each subsequent text fragment in turn to consider it for inclusion in the candidate table of contents. The candidate table of contents is extended by adding subsequent contiguous text fragments until the addition of a new text fragment breaks the ordering constraint. For example, if last added text fragment is an indexing text fragment having candidate linked body text fragments #j=15 and #j=33, and the next indexing text fragment under consideration has a link only to candidate linked body text fragment #j=20, then this next indexing text fragment can be added to the candidate table of contents since #j=20 is greater than #j=15. If, however, the next indexing text fragment only has a link to candidate linked body text fragment #j=12, then this would break the ordering. However, it is advantageous to relax the ordering constraint somewhat to allow for a few holes in the candidate table of contents. This is suitably achieved by permitting the presence of a certain number of text fragments without any associated links, and by permitting a certain number of fragments with link-crossing, that is, a text fragment for which all of its associated links break the ordering constraints in the candidate table of contents. Allowing some link-crossing is useful if for example the previous text fragment in the current candidate table of contents contained only one link pointing too far ahead in the document.

This processing is repeated for each of the T-Δ possible starting text fragments. The result is a set of one or more candidate tables of contents, each formed of a sub-sequence of the ordered sequence of indexing text fragments 14. Because the candidate tables of contents were constructed in a way that ensures that the ordering constraint can be obeyed (while optionally allowing for a limited number of holes), it follows that it is possible to select for each entry of the candidate table of contents one link from its list of acceptable links so that the ordering constraint is respected. Optionally, filtering criteria may be applied by the candidate tables of contents selector 30 to remove candidate tables of contents that are clearly not correct. For example, a candidate table of contents having fewer than the expected minimum Δ text fragments may suitably be discarded.

A table of contents selector 34 ranks the candidate tables of contents and selects the highest ranked table of contents. A links optimizer 38 then optimizes the links for that selected table of contents to produce the final selected table of contents 110. In this approach, the table of contents selector 34 ranks the candidate tables of contents using a computationally efficient ranking method, and only the selected table of contents then undergoes the more computationally intensive processing performed by the links optimizer 38. This approach has been found to be satisfactory for accurately selecting the table of contents. A more computationally intensive approach is also contemplated, in which the links optimization is performed for each of the candidate tables of contents and the ranking takes into account the results of the links optimizations.

With continuing reference to FIG. 1, the table of contents selector 34 employs a scoring function to rank the candidate tables of contents. The highest ranked candidate table of contents is then selected for further processing. In some embodiments, the scoring function is the sum of entry weights, where an entry weight is inversely proportional to the number of candidate links associated with an entry of the candidate table of contents. This entry weight characterizes the certainty of any of its associated links, under the assumption that the more links initiate at a given indexing text fragment, the less likely that any one of those links is a "true" link of a table of contents. Other scoring functions can be employed. For example, another contemplated scoring function sums the number of entries in the candidate table of contents. A short candidate table of contents is typically less likely to be "correct" than a long table of contents in which a large contiguous sequence of text fragments is found to be capable of satisfying the ordering and non-self-referencing criteria. Yet another contemplated scoring function characterizes the span of the linked body text fragments respective to the entire document 8. If the available linked body text fragments of a particular candidate table of contents span only a small portion of the document 8, then it is unlikely that the candidate table of contents is the "true" table of contents for that document. These scoring functions are examples, and other scoring functions, or various combinations of scoring functions, can be employed.

Once the highest ranked candidate table of contents has been selected, the links optimizer 38 is applied to that table of contents to produce the final table of contents 110. The selection of the best link for each of the entries of the table of contents involves finding a global optimum for the table of contents while respecting the four table of contents constraints: contiguity, text similarity, ordering, and non-self-referencing. In some embodiments, a weight is associated to each link, which is proportional to its level of matching. In some embodiments, a Viterbi shortest path algorithm is employed in selecting the optimized links. Other algorithms can also be employed for selecting the optimized links.

In embodiments in which the table of contents is expected to span the entire table of contents region 10, or is expected to span almost the entire table of contents region 10, the candidate table of contents selector 30 and table of contents selector 34 are optionally omitted, and the links optimizer 38 is applied to a table of contents corresponding to the entire ordered sequence of indexing text fragments 14 extracted from the table of contents region 10. In such embodiments, small discrepancies between the table of contents region 10 and the actual span of the table of contents (for example, due perhaps to a table of contents heading at the top of the table of contents region 10, or due to a text fragment corresponding to a page number or corresponding to a page header, or so forth) are readily accommodated as holes in the table of contents.

In some applications, the identified table of contents is used for further processing. For example, the table of contents 110 can be employed by a document organizer 120 to structure the unstructured document 8 by dividing it up into text sections linked to table of contents entries to produce a structured document. When the table of contents is used for automated structuring of the document, it is typically advantageous to strictly enforce the ordering criterion since cross-linking can lead to errors in the formatting of the structured document. While the foregoing has particularly addressed the example application of identifying a table of contents indexing text sections, it is to be appreciated that the disclosed approaches are also applicable to identifying tables of contents indexing other features of a document, such as figures (commonly called a "table of figures"), tables (commonly called a "table of tables"), equations, and so forth.

In general, for T indexing text fragments and N body text fragments, the number of text fragment pairwise comparisons to be performed by the textual similarity links identifier 20 is T×N. For a document containing tens of thousands of body text fragments 16 and a table of contents region 10 containing dozens or hundreds of indexing text fragments 14, T×N pairwise comparisons typically corresponds to millions, tens of millions, or more pairwise textual comparisons, each of which involves computing a Jaccard or other typically relatively computationally involved comparison measure. Accordingly, the search range selector 24 is employed to identify sub-sequences of the ordered sequence of body text fragments 16 for searching, so that the number of text fragment pairwise comparisons is typically substantially less than T×N.

Figure 3:
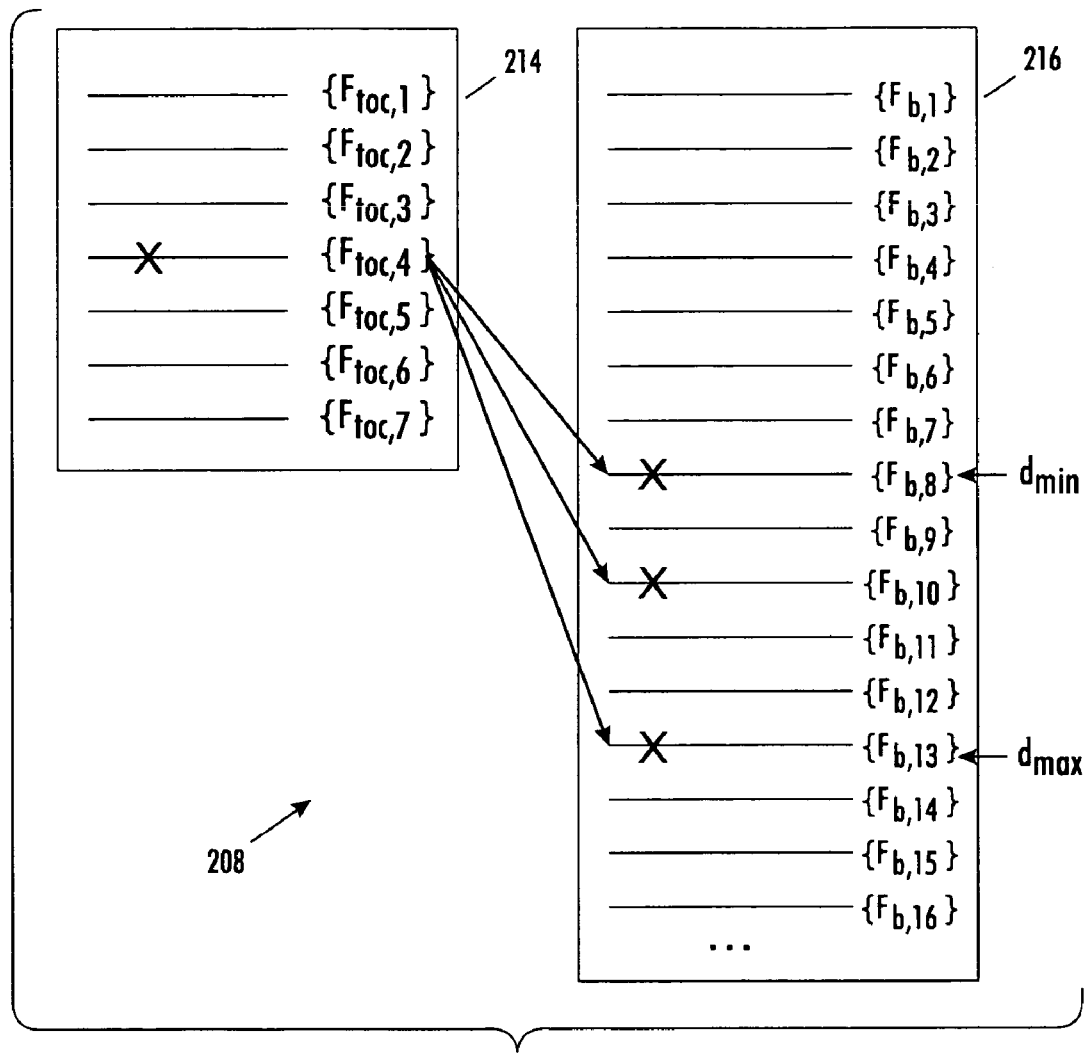
FIGS. 3-5 diagrammatically show an initial iteration of links identification processing.
Figure 4:
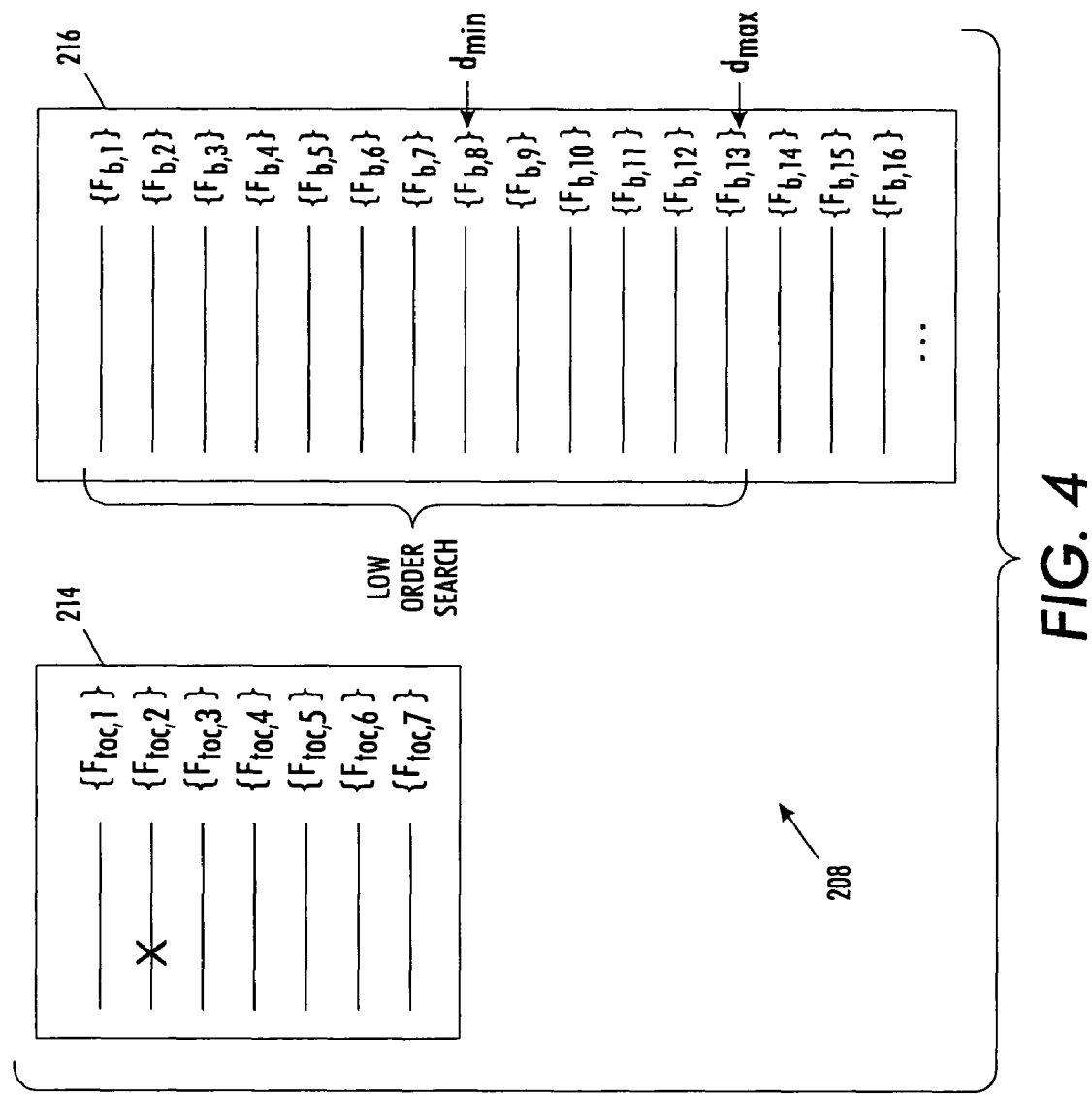

With continuing reference to FIG. 1 and with further reference to FIG. 3, an example document 208 includes ordered sequence of indexing text fragments 214 includes seven indexing text fragments ordered $\{F_{toc,1}\} \ldots \{F_{toc,7}\}$, and an ordered sequence of body text fragments 216 ordered $\{F_{b,1}\}$, $\{F_{b,2}\}, \{F_{b,3}\}, \ldots$ An initial indexing text fragment $\{F_{toc,4}\}$ at about the middle of the ordered sequence of indexing text fragments 214 is selected and associated with candidate linked body text fragments $\{F_{b,8}\}, \{F_{b,10}\}, \{F_{b,13}\}$ by the textual similarity links identifier 20. In processing the initial indexing text fragment, the entire ordered sequence of body text fragments 216 is suitably searched. The resulting set of one or more candidate linked body text fragments $\{F_{b,8}\}$, $\{F_{b,10}\}, \{F_{b,13}\}$ includes a lowest order member $\{F_{b,8}\}$ that defines a minimum order $d_{min}$ for the link with the initial indexing text fragment $\{F_{toc,4}\}$, and also includes a highest order member $\{F_{b,13}\}$ that defines a maximum order $d_{max}$ for the link with indexing text fragment $\{F_{toc,4}\}$. Subsequently, the search range selector 24 can use the minimum and maximum order values $d_{min}$, $d_{max}$ for the initial indexing text fragment $\{F_{toc,4}\}$ to restrict the search range for associating subsequent indexing text fragments with candidate body text fragments. For example, With reference to FIG. 4, a lower-ordered indexing text fragment $\{F_{toc,2}\}$ at lower order than the initial indexing text fragment $\{F_{toc,4}\}$ is associated with a set of one or more candidate linked body text fragments. To do so, the search range selector 24 recognizes that the maximum order value $d_{max}$, in conjunction with the ordering constraint, is suitably used to impose a limit on the search range for candidate links with the lower-ordered indexing text fragment $\{F_{toc,2}\}$—the range to be searched is $\{F_{b,1}\} \ldots d_{max}-1=\{F_{b,1}\} \ldots \{F_{b,12}\}$. If the linked body text fragment for $\{F_{toc,2}\}$ was at order value $d_{max}$ or greater, then the ordering constraint would be violated for $\{F_{toc,2}\}$ respective to $\{F_{toc,4}\}$, since $\{F_{toc,2}\}$ is earlier in the table of contents and yet would link to a body text fragment that is ordered later than the body text fragment linked with $\{F_{toc,4}\}$.

Figure 5:
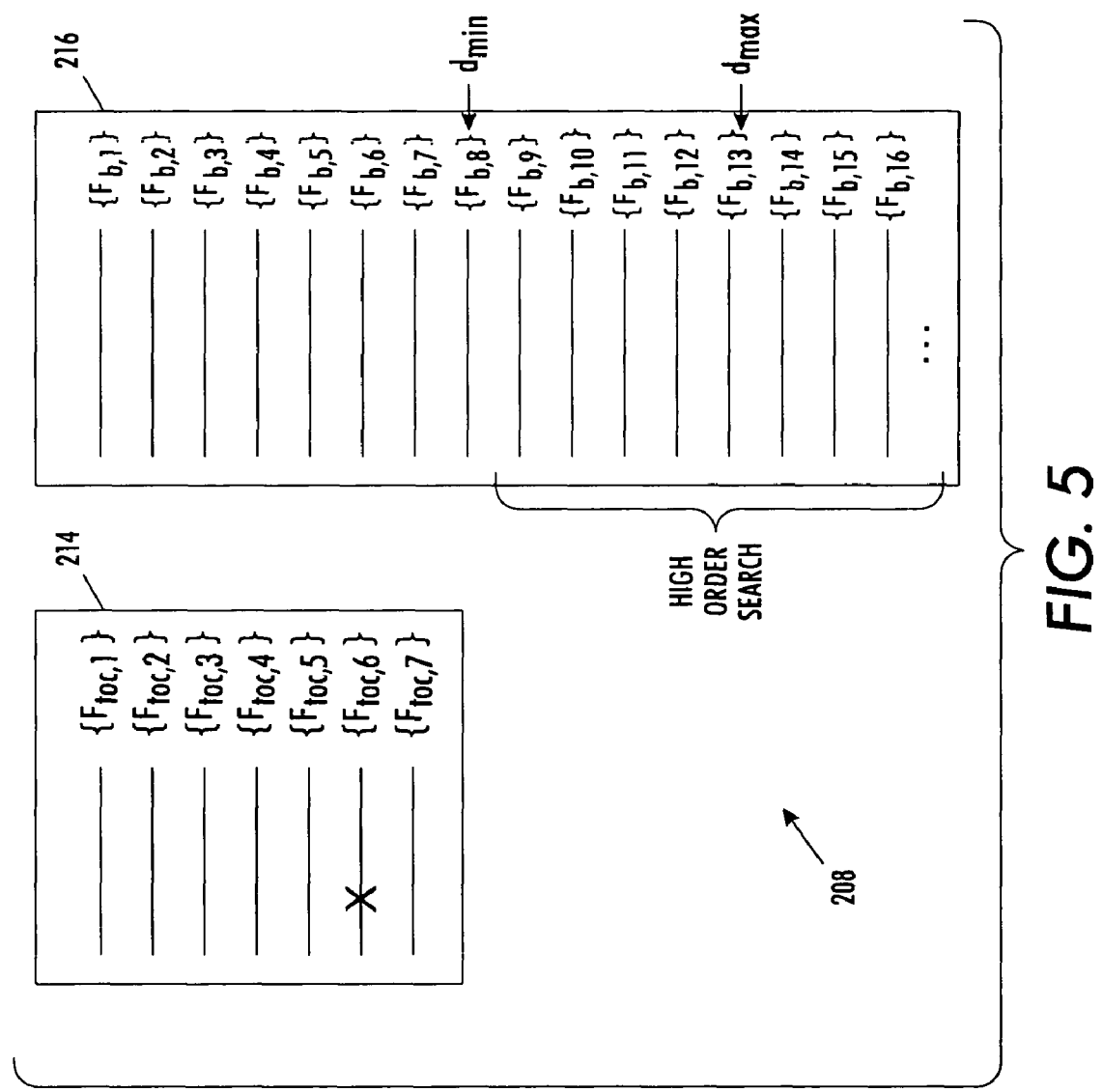

With reference to FIG. 5, in similar fashion a higher-ordered indexing text fragment $\{F_{toc,6}\}$ at higher order than the initial indexing text fragment $\{F_{toc,4}\}$ is associated with a set of one or more candidate linked body text fragments. To do so, the search range selector 24 recognizes that the minimum order value $d_{min}$, in conjunction with the ordering constraint, is suitably used to impose a limit on the search range for candidate links with the higher-ordered indexing text fragment $\{F_{toc,6}\}$—the range to be searched starts at index value $d_{min}+1=\{F_{b,9}\}$ and ends at the last ordered body text fragment. If the linked body text fragment for $\{F_{toc,6}\}$ was at order value $d_{min}$ or less, then the ordering constraint would be violated for $\{F_{toc,6}\}$ respective to $\{F_{toc,4}\}$, since $\{F_{toc,6}\}$ is later in the table of contents and yet would link to a body text fragment that is ordered earlier than the body text fragment linked with $\{F_{toc,4}\}$.

Figure 6:
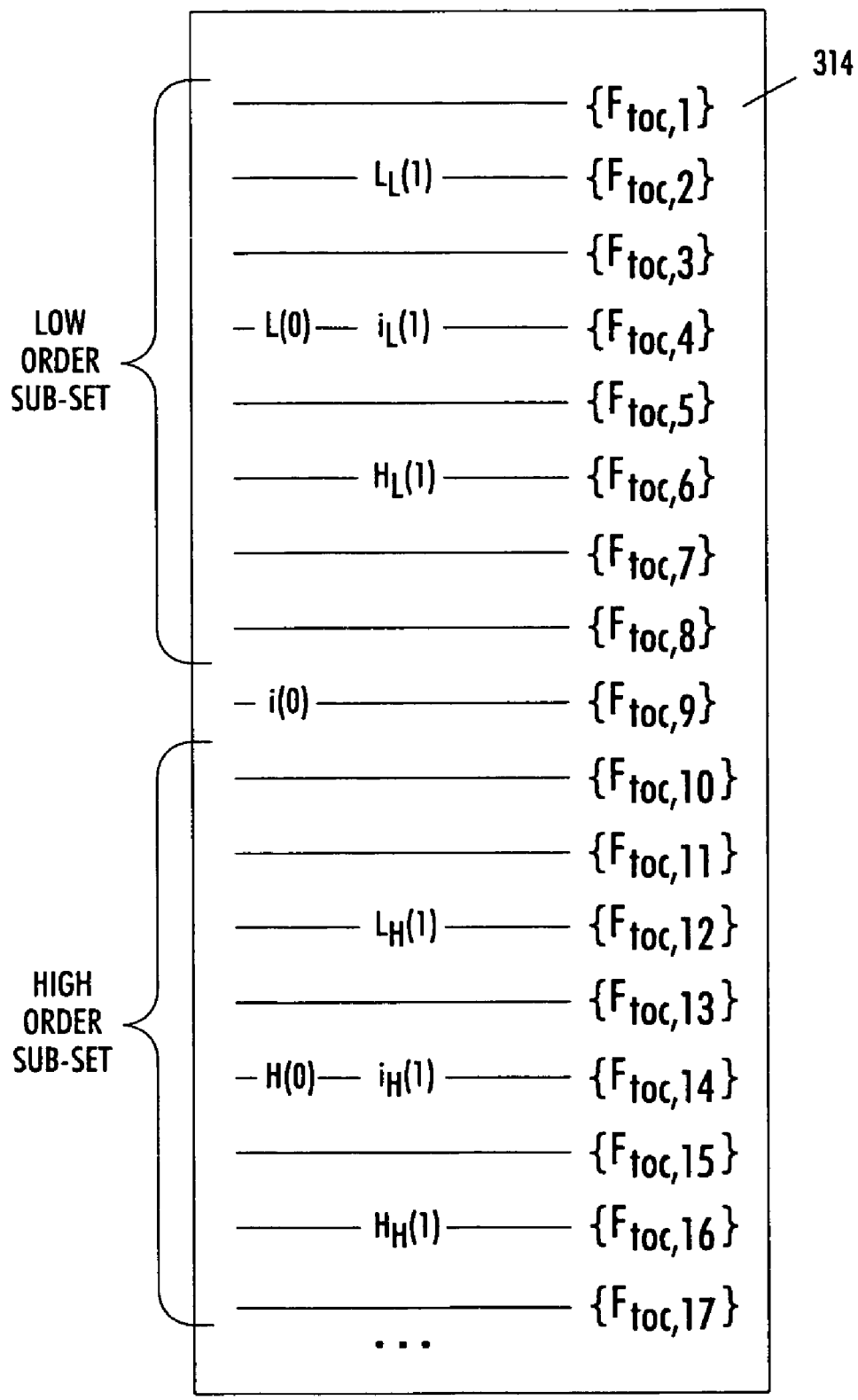
FIG. 6 diagrammatically shows two iterations of links identification processing for a longer table of contents.

With reference to FIG. 6, in some embodiments, the process is performed iteratively. FIG. 6 shows a larger illustrative ordered sequence of indexing text fragments 314 that includes seventeen indexing text fragments ordered $\{F_{toc,1}\} \ldots \{F_{toc,17}\}$. An initial indexing text fragment (denoted i(0) in FIG. 6 where the "0" value in parenthesis indicates the zeroeth iteration) is selected to be $\{F_{toc,9}\}$ which is at about the middle of the ordered sequence of indexing text fragments 314. A set of one or more candidate linked body text fragments (not shown) are identified for initial indexing text fragment i(0), which define minimum and maximum order values $d_{min}$ and $d_{max}$. Then, a lower ordered indexing text fragment (denoted L(0) in FIG. 6) is selected about midway between the first indexed body text fragment $\{F_{toc,1}\}$ and the initial indexing text fragment i(0). Candidate body text fragments for possible linkage with lower-order indexing text fragment L(0) are selected by searching the sub-sequence of body text segments $\{F_{b,1}\} \ldots d_{max}-1$, recognizing that linking any higher ordered body text segment with L(0) would violate the ordering constraint. Similarly, a higher ordered indexing text fragment (denoted H(0) in FIG. 6) is selected about midway between the initial indexing text fragment i(0) and the last indexed body text fragment $\{F_{toc,17}\}$. Candidate body text fragments for possible linkage with higher-order indexing text fragment H(0) are selected by searching the sub-sequence of body text segments starting at $d_{min}+1$ and terminating at the last ordered body text fragment of the ordered sequence of body text fragments, recognizing that linking any body text segment ordered less than or equal to $d_{min}$ with H(0) would violate the ordering constraint.

With continuing reference to FIG. 6, in order to continue iteratively, a low-order sub-set of the ordered sequence of indexing text fragments 314 is defined by the set of indexing text fragments at lower order than the initial indexing text fragment i(0). Similarly, a high-order sub-set of the ordered sequence of indexing text fragments 314 is defined by the set of indexing text fragments at higher order than the initial indexing text fragment i(0). Each of the low-order sub-set and the high-order sub-set are separately processed in a next iteration (that is, the first iteration indicated by the "1" value in parenthesis). An initial indexing text fragment $i_L(1)$ is selected for the low-order sub-set at about the middle of the low-order sub-set (that is, about midway between $\{F_{toc,1}\}$ and i(0)). A separate initial indexing text fragment $i_H(1)$ is selected for the high-order sub-set at about the middle of the high-order sub-set (that is, about midway between i(0) and the highest indexed body text fragment).

In performing the first iteration in the low-order sub-set, a lower-ordered indexing text fragment $L_L(1)$ is identified about midway between the top of the low-order sub-set and initial indexing text fragment $i_L(1)$, and a higher-ordered indexing text fragment $H_L(1)$ is identified about midway between the initial indexing text fragment $i_L(1)$ and the bottom of the low-order sub-set. The candidate links for lower-ordered and higher-ordered indexing text fragments $L_L(1)$, $H_L(1)$ are found using the $d_{max}$ and $d_{min}$ values of $i_L(1)$, respectively, as search limits.

Similarly, in the high-order sub-set, a lower-ordered indexing text fragment $L_H(1)$ is identified about midway between the top of the high-order sub-set and the initial indexing text fragment $i_H(1)$, and a higher-ordered indexing text fragment $H_H(1)$ is identified about midway between the initial indexing text fragment $i_H(1)$ and the bottom of the high-order sub-set. The candidate links for lower-ordered and higher-ordered indexing text fragments $L_H(1)$, $H_H(1)$ are found using the $d_{max}$ and $d_{min}$ values of $i_H(1)$, respectively, as search limits. This process can be iterated, for example by next dividing the low-order sub-set of FIG. 6 into smaller low-order and high-order sub-sets (not shown), and similarly dividing the high-order sub-set of FIG. 6 into smaller low-order and high-order sub-sets (not shown).

In FIGS. 3-6, the initial indexing text fragment, lower-ordered indexing text fragment, and higher-ordered indexing text fragment are each a single indexing text fragment. However, if the table of contents contains holes, then there is a possibility that a selected initial, lower-ordered, or higher-ordered indexing text fragment might correspond to a hole having no candidate linked body text fragments. To accommodate such a situation, the initial text fragment may include an initial plurality of contiguous indexing text fragments at about the middle of the ordered sequence of indexing text fragments. Each of the Initial plurality of indexing text fragments is associated with a set of one or more candidate linked body text fragments selected from the ordered sequence of body text fragments. Similarly, the lower-ordered indexing text fragment may include a contiguous plurality of lower-ordered indexing text fragments, and the higher-ordered indexing text fragment may include a contiguous plurality of higher-ordered indexing text fragments. By making the number of initial, higher-ordered, and lower-ordered indexing text fragments greater than the maximum allowable number of contiguous holes, it is ensured that $d_{min}$ and $d_{max}$ values are defined, so that the iterative processing of FIGS. 3-6 is robust against holes in the table of contents.

The method of FIGS. 3-6 has been applied to a sample 1300 page document having 261 indexing text fragments in the table of contents, and 55,238 body text fragments. Without using the search range selector 24, the number of pairwise text fragment comparisons was N×T=(261)×(55,238)=14, 417,118 comparisons, which were processed by the textual similarity links identifier 20 in 170 seconds. By using the search range selector 24, the number of pairwise text fragment comparisons was reduced to 8,414,288 processed by the textual similarity links identifier 20 in 110 seconds, providing about 40% speed gain. The overall processing time went down from 260 seconds to 155 seconds, which is also about 40% speed gain, indicating that the subsequent processing 30, 34, 38 also benefited from the reduced total number of candidate links.

In some embodiments, the table of contents may be substantially smaller than the table of contents region 10 (that is, the table of contents region 10 may include a substantial number of text fragments before and/or after the text fragments of the table of contents). This is addressed at least in part by employing the table of contents selector 30 to identify the table of contents within the table of contents region 10. However, an additional problem may arise if there are extra text fragments before and/or after the table of contents (but within the table of contents region 10), since links involving these outlying text fragments which are not part of the table of contents are not expected to obey the ordering constraint. To deal with such situations, the number of iterations is optionally restricted, for example to three iterations, so that the table of contents region 10 is split into no more than four parts (for three iterations, the zeroeth iteration processes the table of contents region 10 as a whole; first iteration processes the table of contents region 10 as two parts; second iteration processes the table of contents region 10 as four parts). This ensures that the approximately first and last quarters of the table of contents region 10 are not used to compute any $d_{min}$ or $d_{max}$ values. This approach enhances robustness when about one quarter or less of the table of contents region 10 lies outside of the actual table of contents. However, the speed gain is reduced by limiting the number of iterations. For example, on the aforementioned 1300 page document, the gain was reduced from 40% to 20% by limiting the number of iterations to three.

Figure 7:
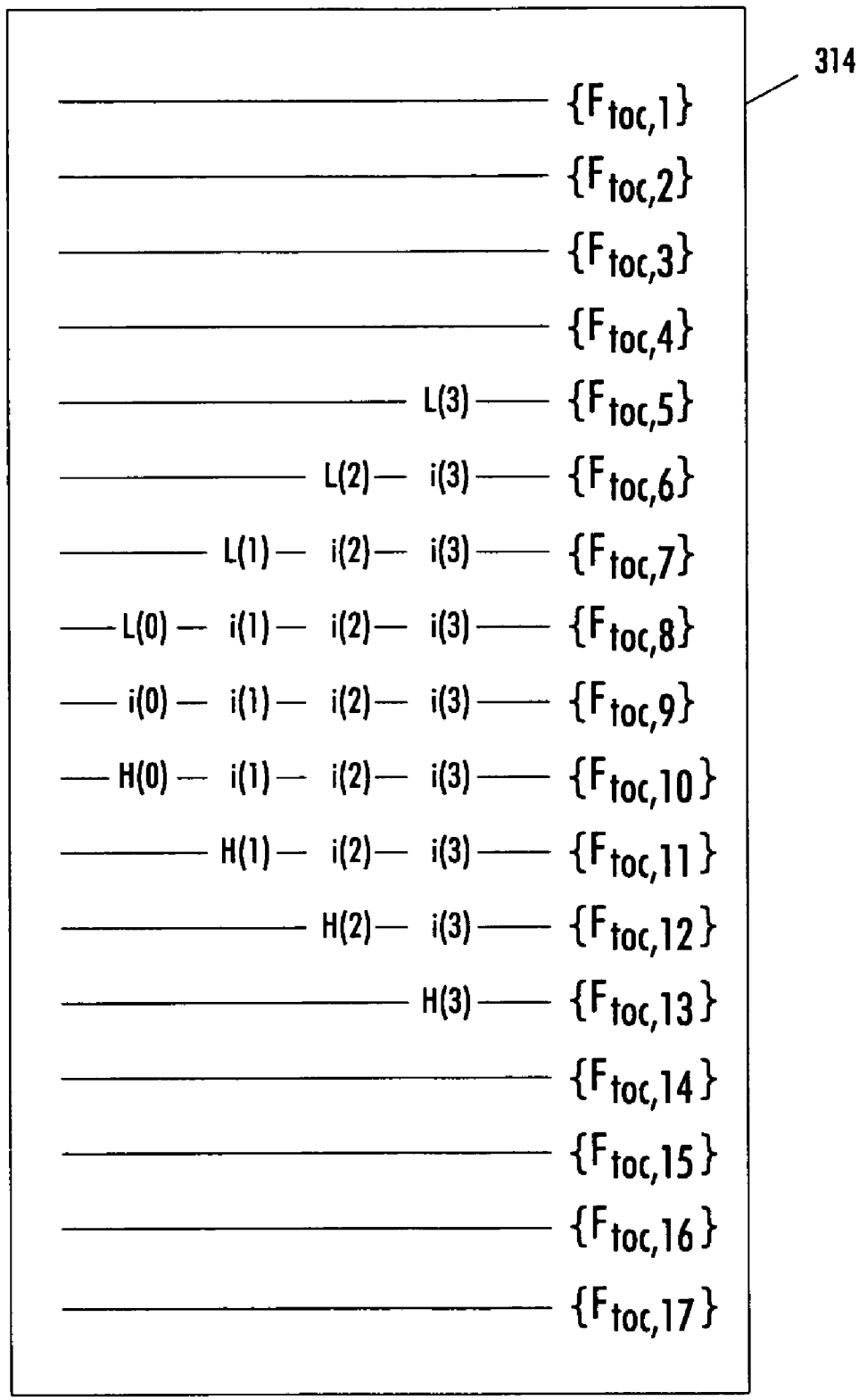
FIG. 7 diagrammatically shows four iterations of links identification processing using an alternative process applied to the same table of contents as that of FIG. 6.

With reference to FIG. 7, another approach is set forth for improving robustness against extraneous text fragments in the table of contents region 10 outside of the actual table of contents. FIG. 7 shows this alternative approach applied to the same illustrative ordered sequence of indexing text fragments 314 including seventeen indexing text fragments ordered $\{F_{toc,1}\} \ldots \{F_{toc,17}\}$ as was shown in FIG. 6. In this alternative approach, the zeroeth iteration initial indexing text fragment i(0) is selected at about the middle of the table of contents region 10, same as in FIG. 6. (In all cases, the indicated single selected indexing text fragment may optionally include a plurality of contiguous indexing text fragments preferably spanning a range greater than the expected maximum number of contiguous holes, so as to improve robustness against holes in the table of contents). The initial indexing text fragment i(0) is associated with one or more candidate linked body text fragments thus defining $d_{min}$ and $d_{max}$ values, again as in FIG. 6.

However, in the alternative approach of FIG. 7, the lower-ordered and upper-ordered indexing text fragments L(0), H(0) are selected differently. In FIG. 7, the lower-ordered indexing text fragment L(0) is selected to abut the initial indexing text fragment i(0) in the ordered sequence of indexing text fragments 314, and similarly the higher-ordered indexing text fragment H(0) is also selected to abut the initial indexing text fragment i(0) in the ordered sequence of indexing text fragments 314. The selected lower-ordered Indexing text fragment L(0) is processed as before, using the $d_{max}$ value of initial indexing text fragment i(0) to limit the range of body text fragments to search for links to lower-ordered indexing text fragment L(0). The selected higher-ordered indexing text fragment H(0) is also processed as before, using the $d_{min}$ value of initial indexing text fragment i(0) to limit the range of body text fragments to search for links to higher-ordered indexing text fragment H(0).

In the first iteration, the zeroeth iteration initial and abutting lower-order and higher-order indexing text fragments now define the first iteration initial indexing text fragment as a plurality of contiguous indexing text fragments i(1) corresponding to the contiguous set of indexing text fragments {L(0),i(0),H(0)} located at about the middle of the table of contents region, with the $d_{min}$ value for the first iteration being the lowest candidate linked body text fragment of this plurality of first iteration initial indexing text fragments i(1), and the $d_{max}$ value for the first iteration being the highest candidate linked body text fragment of this plurality of first iteration initial indexing text fragments i(1). The first iteration lower-order and higher-order indexing text fragments L(1), H(1) are selected to abut the plurality of first iteration initial indexing text fragments i(1), and are processed using the $d_{min}$ and $d_{max}$ values of i(1) as range limiters.

For the second iteration, the contiguous sequence of indexing text fragments {L(1),i(1),H(1)} now define the second iteration plurality of initial indexing text fragments i(2), and abutting lower-ordered and higher-ordered indexing text fragments L(2), H(2) are processed. For the third iteration, the contiguous sequence of indexing text fragments {L(2),i(2),H(2)} now define the third iteration plurality of initial indexing text fragments i(3), and abutting lower-ordered and higher-ordered indexing text fragments L(3), H(3) are processed. As an iterative process, the selecting and associating of the lower-ordered and higher-ordered indexing text fragments for each iteration continues, with the initial indexing text fragment for each iteration being the contiguous sequence of initial and abutting lower-ordered and higher-ordered indexing text fragments of the previous iteration.

In FIG. 7, the zeroeth iteration initial indexing text fragment i(0) and the lower-ordered indexing text fragment and higher-ordered indexing text fragment of each iteration are single indexing text fragments. However, if the table of contents contains holes, then there is a possibility that a single indexing text fragment might correspond to a hole having no linked body text fragments in the final table of contents. To accommodate such a situation, the zeroeth iteration initial indexing text fragment i(0) is suitably an initial plurality of contiguous indexing text fragments at about the middle of the ordered sequence of indexing text fragments, for example N indexing text fragments. Each of the initial plurality of indexing text fragments is associated with a set of one or more candidate linked body text fragments selected from the ordered sequence of body text fragments. The values of $d_{min}$ and $d_{max}$ are determined as the lowest and highest indices of these candidate linked body text fragments linked to the zeroeth iteration plurality of contiguous indexing text fragments i(0). By making N, that is, the number of initial indexing text fragments i(0), greater than the maximum allowable number of contiguous holes, it is ensured that $d_{min}$ and $d_{max}$ values are defined. In some embodiments, processing is thereafter substantially the same as in FIG. 7.

In other embodiments, processing thereafter employs separate oppositely directed sliding windows of initial indexing text fragments of fixed length for each iteration after the initial iteration. The search for each lower-order indexing text fragment is limited by the $d_{max}$ value for N contiguous indexing text fragments at higher order and abutting the current lower-order indexing text fragment in the ordered sequence of indexing text fragments 14. The search for each higher-order indexing text fragment is limited by the $d_{min}$ value for those N contiguous indexing text fragments at lower order and abutting the current higher-order indexing text fragment in the ordered sequence of indexing text fragments 14. After each iteration, the order of the lower-order indexing text fragment is decremented, thus sliding the corresponding N-fragment window "upward" by one fragment, while the order of the higher-order indexing text fragment is incremented, thus sliding the corresponding N-fragment window "downward" by one fragment. This approach can use a single indexing text fragment for each higher-order or lower-order indexing text fragment, or can use abutting continuous pluralities of text fragments for the lower-order and higher-order indexing text fragments. In the latter approach, the upper sliding window suitably moves by the number of contiguous lower-order indexing text fragments in each iteration, and similarly the lower sliding window suitably moves by the number of contiguous higher-order indexing text fragments in each iteration. It is also contemplated for the two sliding windows to be of different lengths, for example N contiguous indexing text fragments in the upper sliding window and M contiguous indexing text fragments in the lower sliding window.

An advantage of the approach of FIG. 7 is that it is robust against extraneous noise text fragments at the beginning and/or end of the table of contents (but within the table of contents region 10). The contiguous sequence of initial indexed text fragments expands upward and downward from the middle of the table of contents region 10 with each iteration, thus avoiding early processing the potentially noisy outlying areas of the table of contents region 10.

Having set forth the example illustrative textual similarity-based table of contents extractor, some techniques for improving the robustness of table of contents extraction are set forth with illustrative example application thereto. It is to be appreciated that the techniques disclosed herein are generally applicable to other types of table of contents extraction techniques. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
identifying a table of contents in a document by:
associating an initial indexing text fragment at about the middle of an ordered sequence of indexing text fragments with an initial set of one or more candidate linked body text fragments selected from an ordered sequence of body text fragments,
associating a lower-ordered indexing text fragment at lower order than the initial indexing text fragment with a set of one or more candidate linked body text fragments at lower order than the highest order member of the initial set of one or more candidate linked body text fragments,
associating a higher-ordered indexing text fragment at higher order than the initial indexing text fragment with a set of one or more candidate linked body text fragments at higher order than the lowest order member of the initial set of one or more candidate linked body text fragments,
iteratively repeating the selecting and associating of the lower-ordered and higher-ordered indexing text fragments to associate the indexing text fragments with candidate linked body text fragments, and
optimizing the candidate linked body text fragments to determine a one-to-one association between indexing text fragments and linked body text fragments.

2. A method as set forth in claim 1, wherein the associating of an initial indexing text fragment comprises:
associating each of an initial plurality of contiguous indexing text fragments at about the middle of the ordered sequence of indexing text fragments with a corresponding portion of the initial set of one or more candidate linked body text fragments selected from the ordered sequence of body text fragments.

3. A method as set forth in claim 2, wherein:
the associating of a lower-ordered indexing text fragment includes associating each of a plurality of contiguous lower-ordered indexing text fragments at lower order than the initial plurality of contiguous indexing text fragments with a set of one or more candidate linked body text fragments at lower order than the highest order member of the initial set of one or more candidate linked body text fragments; and
the associating of a higher-ordered indexing text fragment includes associating each of a plurality of contiguous higher-ordered indexing text fragments at higher order than the initial plurality of contiguous indexing text fragments with a set of one or more candidate linked body text fragments at higher order than the lowest order member of the initial set of one or more candidate linked body text fragments.

4. A method as set forth in claim 2, wherein the number of indexing text fragments in the initial plurality of contiguous indexing text fragments is greater than a maximum number of holes allowable in the identified table of contents.

5. A method as set forth in claim 1, further comprising:
  selecting the lower-ordered indexing text fragment to be at about the middle of a low-order sub-set of the ordered sequence of indexing text fragments defined by the set of indexing text fragments at lower order than the initial indexing text fragment; and
  selecting the higher-ordered indexing text fragment to be at about the middle of a high-order sub-set of the ordered sequence of indexing text fragments defined by the set of indexing text fragments at higher order than the initial indexing text fragment.

6. A method as set forth in claim 5, performed as an iterative process comprising:
  for each iteration, repeating the selecting and associating of the lower-ordered and higher-ordered indexing text fragments for the low-order sub-set of the ordered sequence of indexing text fragments using the lower-ordered indexing text fragment of the previous iteration as the initial indexing text fragment; and
  for each iteration, repeating the selecting and associating of the lower-ordered and higher-ordered indexing text fragments for the high-order sub-set of the ordered sequence of indexing text fragments using the higher-ordered indexing text fragment of the previous iteration as the initial indexing text fragment.

7. A method as set forth in claim 1, further comprising:
  selecting the lower-ordered indexing text fragment to abut the initial indexing text fragment in the ordered sequence of indexing text fragments; and
  selecting the higher-ordered indexing text fragment to abut the initial indexing text fragment in the ordered sequence of indexing text fragments.

8. A method as set forth in claim 7, performed as an iterative process comprising:
  repeating the selecting and associating of the lower-ordered and higher-ordered indexing text fragments for each iteration with the initial indexing text fragment for that iteration including the initial and abutting lower-ordered and abutting higher-ordered indexing text fragments of the previous iteration.

9. A method as set forth in claim 1, wherein after the optimizing at least one indexing text fragment is not associated with a linked body text fragment.

10. A method as set forth in claim 1, further comprising:
  organizing the document into a structured document having a structure incorporating the one-to-one association between indexing text fragments and linked body text fragments.

11. A method as set forth in claim 1, wherein the associating operations comprise:
  selecting candidate linked body text fragments based on textual similarity with the corresponding indexing text fragment.

12. A method comprising:
  identifying a table of contents in a document by:
    (a) associating an initial indexing text fragment at about the middle of an ordered sequence of indexing text fragments with an initial set of one or more candidate linked body text fragments selected from an ordered sequence of body text fragments;
    (b) selecting the lower-ordered indexing text fragment to be at about the middle of a low-order sub-set of the ordered sequence of indexing text fragments defined by the set of indexing text fragments at lower order than the initial indexing text fragment;
    (c) selecting the higher-ordered indexing text fragment to be at about the middle of a high-order sub-set of the ordered sequence of indexing text fragments defined by the set of indexing text fragments at higher order than the initial indexing text fragment;
    (d) associating the lower-ordered indexing text fragment with a set of one or more candidate linked body text fragments at lower order than the highest order member of the initial set of one or more candidate linked body text fragments;
    (e) associating the higher-ordered indexing text fragment with a set of one or more candidate linked body text fragments at higher order than the lowest order member of the initial set of one or more candidate linked body text fragments;
    (f) repeating the selecting and associating operations (b), (c), (d), (e) for the low-order sub-set of the ordered sequence of indexing text fragments using the lower-ordered indexing text fragment as the initial indexing text fragment;
    (g) repeating the selecting and associating operations (b), (c), (d), (e) for the high-order sub-set of the ordered sequence of indexing text fragments using the higher-ordered indexing text fragment as the initial indexing text fragment; and
    (h) optimizing the candidate linked body text fragments to identify a table of contents including indexing text fragments each linked to a body text fragment.

13. A method as set forth in claim 12, wherein the initial indexing text fragment, the lower-ordered indexing text fragment, and the higher-ordered indexing text fragment each comprise a contiguous sub-sequence of two or more indexing text fragments.

14. A method as set forth in claim 12, wherein after the optimizing at least one indexing text fragment is not associated with a linked body text fragment.

15. A method as set forth in claim 12, further comprising:
  organizing the document into a structured document having a structure constructed based on the identified table of contents.

16. A method as set forth in claim 12, wherein the associating operations (a), (d), (e) each comprise:
  selecting candidate linked body text fragments based on textual similarity with the corresponding indexing text fragment.

17. A method comprising:
  identifying a table of contents in a document including of an ordered sequence of indexing text fragments and an ordered sequence of body text fragments by:
    associating a lower-ordered indexing text fragment with a set of one or more candidate linked body text fragments at lower order in the ordered sequence of body text fragments than a highest order candidate linked body text fragment associated with a set of N contiguous indexing text fragments at higher order and abutting the lower-ordered indexing text fragment in the ordered sequence of indexing text fragments;
    associating a higher-ordered indexing text fragment with a set of one or more candidate linked body text fragments at higher order in the ordered sequence of body text fragments than a lowest order candidate linked body text fragment associated with a set of M contiguous indexing text fragments at lower order and abutting the higher-ordered indexing text fragment ordered sequence of indexing text fragments;
    decrementing the order of the lower-ordered indexing text fragment;

incrementing the order of the higher-ordered indexing text fragment;

repeating the associating of the lower-ordered indexing text fragment, the associating of the higher-ordered indexing text fragment, the decrementing, and the incrementing to generate sets of one or more candidate linked body text fragments associated with the indexing text fragments; and optimizing the candidate linked body text fragments to identify the table of contents including indexing text fragments each linked to a body text fragment.

18. A method as set forth in claim 17, wherein N=M.

19. A method as set forth in claim 17, wherein after the optimizing at least one indexing text fragment is not associated with a linked body text fragment.

20. A method as set forth in claim 17, further comprising:

organizing the document into a structured document having a structure constructed based on the identified table of contents.

21. A method as set forth in claim 17, wherein the associating operations comprise:

selecting candidate linked body text fragments based on textual similarity with the corresponding indexing text fragment.

* * * * *